(12) United States Patent
Zuber et al.

(10) Patent No.: US 6,720,104 B2
(45) Date of Patent: Apr. 13, 2004

(54) PEM FUEL CELL STACK

(75) Inventors: Ralf Zuber, Grossostheim (DE);
Armin Bayer, Freigericht (DE); Heike Kühnhold, Bruchköbel (DE); Udo Stenke, Mainaschaff (DE)

(73) Assignee: DMC2 Degussa Metals Catalysts Cerdec AG, Hanau (DE)

( * ) Notice: Subject to any disclaimer, the term of this patent is extended or adjusted under 35 U.S.C. 154(b) by 336 days.

(21) Appl. No.: 09/933,121

(22) Filed: Aug. 21, 2001

(65) Prior Publication Data

US 2002/0051901 A1 May 2, 2002

(51) Int. Cl.$^7$ ................................................ H01M 2/14
(52) U.S. Cl. .......................... 429/38; 429/39; 429/34; 429/35; 429/36; 429/40; 429/41
(58) Field of Search .................. 429/34, 35, 36, 429/38, 39, 40, 41

(56) References Cited

U.S. PATENT DOCUMENTS

| | | | | |
|---|---|---|---|---|
| 6,007,933 A | * | 12/1999 | Jones | 429/38 |
| 6,096,450 A | * | 8/2000 | Walsh | 429/34 |
| 6,127,059 A | * | 10/2000 | Kato | 429/40 |
| 6,261,711 B1 | * | 7/2001 | Matlock et al. | 429/34 |
| 6,303,245 B1 | * | 10/2001 | Nelson | 429/34 |
| 6,399,234 B2 | * | 6/2002 | Bonk et al. | 429/32 |
| 6,416,896 B1 | * | 7/2002 | Tamaru et al. | 429/27 |
| 6,440,597 B1 | * | 8/2002 | Mizuno | 429/34 |
| 6,451,469 B1 | * | 9/2002 | Nakamura et al. | 429/36 |
| 6,503,654 B2 | * | 1/2003 | Marchetti | 429/35 |
| 6,521,367 B2 | * | 2/2003 | Reiser | 429/34 |
| 6,605,381 B1 | * | 8/2003 | Rosenmayer | 429/39 |
| 6,627,035 B2 | * | 9/2003 | Fan et al. | 156/308.2 |

* cited by examiner

Primary Examiner—Bruce F. Bell
(74) Attorney, Agent, or Firm—Kalow & Springut LLP

(57) ABSTRACT

A PEM fuel cell stack including one or more fuel cells (1) arranged on top of one another, each of which contains a membrane electrode assembly (2) between two electrically conductive bipolar plates (3,4), the surfaces of which are equipped with flow channels (10) open on one side for the supply of reactive gases, whereby the membrane electrode assemblies each comprise a polymer electrolyte membrane (5), both sides of which are in contact with a reaction layer (6,7), whereby the surface area of the reaction layers is smaller than that of the polymer electrolyte membrane and a compressible, coarse-pore gas distribution layer (8,9) made from carbon fiber fabric is inserted between each reaction layer and the adjacent bipolar plates congruent to the reaction lawyers along with seals (11,12) in the area outside the surface covered by the gas distribution layers, whereby the gas distribution layers in the no-load condition display a thickness $D_1$ and the seals a thickness $D_2$. The PEM fuel cell stack is featured by the gas distribution layers in the PEM fuel cell stack being compressed to 25 to 60% of the original thickness.

19 Claims, 5 Drawing Sheets

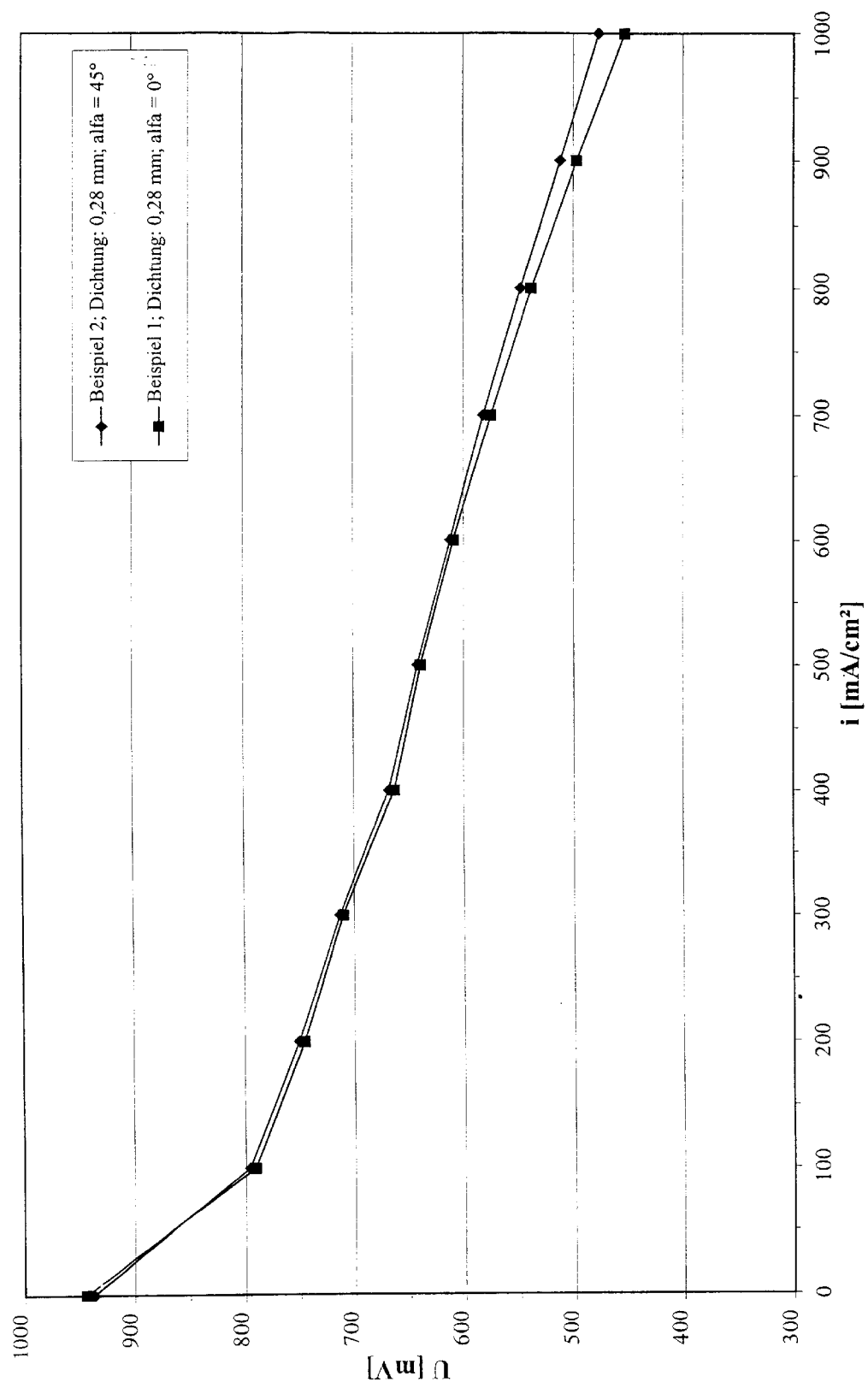
Figur 6

PEM FUEL CELL STACK

INTRODUCTION AND BACKGROUND

The present invention concerns a PEM fuel cell stack consisting of membrane electrode assemblies, gas distribution layers and bipolar plates stacked one above the other. The invention particularly concerns PEM fuel cell stacks containing gas distribution layers consisting of woven carbon fibers.

Fuel cells convert a fuel and an oxidizing agent, which are locally separated from one another at two electrodes, into electricity, heat and water. Hydrogen or a hydrogen-rich gas can be used as the fuel, oxygen or air as the oxidizing agent. The process of energy conversion in the fuel cell is characterized by a particularly high efficiency. For this reason fuel cells in combination with electric motors are gaining growing importance as an alternative to conventional combustion engines.

The compact design, power density and high efficiency of so-called polymer electrolyte fuel cells (PEM fuel cells) make them suitable for use as energy converters in electric cars.

In the context of this invention the term PEM fuel cell stack refers to a stack of fuel cell units. Fuel cell unit is also abbreviated to fuel cell below. Each unit contains a membrane electrode assembly positioned between bipolar plates, also known as separator plates, which serve to supply gas and conduct electricity. A membrane electrode assembly (MEA) consists of a polymer electrolyte membrane, both sides of which are provided with reaction layers, the electrodes. One of the reaction layers takes the form of an anode for oxidizing hydrogen and the second reaction layer that of a cathode for reducing oxygen. So-called gas distribution layers made from carbon fiber paper or carbon fiber fabric or cloth, which allow good access by the reaction gases to the electrodes and good conduction of the electrical current from the cell, are attached to the electrodes. The anode and cathode contain so-called electrocataylsts, which provide catalytic support to the particular reaction (oxidation of hydrogen and reduction of oxygen respectively). The metals in the platinum group of the periodic system of elements are preferably used as catalytically active components. Mainly, so-called support catalysts are used, in which the catalytically active platinum group metals have been applied in highly dispersed form to the surface of a conductive support material. The average crystallite size of the platinum group metals is between around 1 and 10 nm. Fine-particle carbon blacks have proven to be effective as support materials. The polymer electrolyte membrane consists of proton conducting polymer materials. These materials are also referred to below as ionomers. A tetrafluroethylene-flurovinyl ether copolymer with acid functions, particularly sulfuric acid groups, is preferably used. A material of this type is sold under the trade name Nafion® by E.I. DuPont, for example. Other ionomer materials, particularly fluorine-free examples such as sulfonated polyether ketones or aryl ketones or polybenzimidazoles, can also be used, however.

For the broad commercial use of PEM fuel cells in motor vehicles, a wide-ranging improvement in the electrochemical cell output and a marked reduction in system costs is required.

An essential precondition for an increase in cell output is an optimum supply and removal of the various reactive gas mixtures to and from the catalytically active centers of the catalyst layers. In addition to the supply of hydrogen to the anode, the ionomer material from which the anode is made must be continuously humidified with water vapour (humidifying water) in order to guarantee an optimum proton conductivity. The water formed at the cathode (reaction water) must be continuously removed to avoid flooding of the pore system in the cathode and hence an obstruction to the supply of oxygen.

U.S. Pat. No. 4,293,396 describes a gas distribution electrode consisting of an open-pore conductive carbon fiber fabric. The pores in the carbon fiber fabric contain a homogeneous mixture of catalyzed carbon particles (carbon particles having catalytically active components deposited thereon) and hydrophobic particles of a binder material.

The German laid-open patent specification DE 195 44 323 A1 presents a gas distribution electrode for polymer electrolyte fuel cells which contains a carbon fiber fabric impregnated with carbon black and polytetrafluoroethylene.

EP 0 869 568 A1 describes a gas distribution layer consisting of a carbon fiber fabric for membrane electrode assemblies. To improve the electrical contact between the catalyst layers of the membrane electrode assemblies and the carbon fiber fabric of the gas distribution layers, the side of the carbon fiber fabric facing the catalyst layer is coated with a microporous layer of carbon black and a fluoropolymer, which is porous and water-repellent as well as being electrically conductive and also has a fairly smooth surface. This microporous layer preferably penetrates no more than half way through the carbon fiber fabric. The carbon fiber fabric can be pre-treated with a mixture of carbon black and a fluoropolymer to improve its water-repellent properties.

WO 97/13287 describes a gas distribution layer ("intermediate layer" here) which can be obtained by infiltrating and/or coating one side of a coarse-pore carbon substrate (carbon paper, graphite paper or carbon felt) with a composition consisting of carbon black and a fluoropolymer, which reduces the porosity of part of the carbon substrate close to the surface and/or forms a discrete layer of reduced porosity on the surface of the substrate. The gas distribution layer with this coating is land on top of the catalyst layers of the membrane electrode assemblies. As in EP 0 869 568 A1, one of the objects of the coating is to produce a good electrical contact with the catalyst layers.

Coating the gas distribution layers according to WO 97/13287, U.S. Pat. No. 4,293,396, DE 195 44 323 A1 and EP 0 869 568 with a carbon black/PTFE mixture is a complicated process which has to be followed by drying and calcining at 300 to 400° C.

U.S. Pat. No. 6,007,933 describes a fuel cell unit consisting of stacked membrane electrode assemblies and bipolar plates. Flexible gas distribution layers are positioned between the membrane electrode assemblies and the bipolar plates. To supply the membrane electrode assemblies with reactive gases the bipolar plates display gas distribution channels open on one side on the contact surfaces facing the gas distribution layers. In order to improve the electrical contact between the gas distribution layers and the membrane electrode assemblies, the fuel cell unit is assembled under pressure. This involves the risk that the flexible gas distribution layers will penetrate into the gas distribution channels open on one side, thereby obstructing the transport of gas and impairing the electrical output of the fuel cell. This is prevented by means of perforated support plates, for example, which are placed between the gas distribution layers and the bipolar plates. O-ring seals and seals made from PTFE films are used to seal the membrane electrode assemblies.

An object of the present invention is to provide a fuel cell stack exhibiting a simplified construction in comparison to the prior art with the same or improved electrical output.

SUMMARY OF THE INVENTION

The above and other objects of the invention can be achieved by means of a PEM fuel cell stack consisting of one or more fuel cells (1) arranged on top of one another, each of which contains a membrane electrode assembly (2) between two electrically conductive bipolar plates (3,4), the surfaces of which are equipped with flow channels (10) open on one side for the supply of reactive gases. The membrane electrode assemblies each comprise a polymer electrolyte membrane (5), both sides of which are in contact with a reaction layer 6,7). The surface area of the reaction layers is smaller than that of the polymer electrolyte membrane. A compressible, coarse-pore gas distribution layer (8,9) made from carbon fiber fabric is inserted between each reaction layer and the adjacent bipolar plates congruent to the reaction layers along with seals (11,12) in the area outside the surface covered by the gas distribution layers, whereby the gas distribution layers in the no-load condition display a thickness $D_1$ and the seals a thickness of $D_2$. The PEM fuel cell stack is characterized in that the gas distribution layers in the PEM fuel cell stack are compressed to 25 to 60% of their original thickness.

According to the invention the cell resistance (resistance of an individual membrane electrode assembly) is reduced by defined compression of the woven gas distribution layers. The aim is preferably to achieve compression of the gas distribution layers to 30 to 50, particularly 35 to 40% of their original thickness $D_1$. Experience has shown that the specific resistance of the carbon fiber fabric can be reduced to below 6 m$\Omega$cm by compression. The porosity of the gas distribution layer is also reduced to 20 to 70% of the original porosity, thereby preventing flooding of the pores with reaction water. Both effects lead to a decisive improvement in the electrical output of the fuel cell stack.

The defined compression can easily be set by using seals made from non-compressible material whose thickness $D_2$ is less than the thickness $D_1$ of the compressible gas distribution layers in the no-load condition. On assembling the fuel cell stack the compressible gas distribution layers are compressed to the thickness of the seals, such that the compression of the fuel cell stack is obtained by the ratio $D_2/D_1$. In the context of this invention, materials or composite materials whose compressibility is less than 5, preferably less than 1% of the compressibility of the gas distribution layers are designated as non-compressible. Seals made from polytetrafluoroethylene (PTFE), which satisfy the above condition by being reinforced with glass fibers, are preferably used.

The fact that the defined compression of the gas distribution layers avoids the need for the otherwise conventional provision of the gas distribution layers with an electrically conductive microporous layer and the associated complex process steps is particularly advantageous. Moreover, there is also no need for the use of a special support plates intended to prevent penetration by the carbon fiber fabric of the gas distribution layers into the flow channels on the bipolar plates.

The flow channels on the bipolar plates are connected to supply and delivery channels for the reaction gases, which pass vertically through the entire stack of plates outside the area of the membrane electrode assemblies in a peripheral area of the bipolar plates. Between the supply and delivery channels the flow channels are arranged on the contact surfaces of the bipolar plates, generally in the form of right-angled meanders or serpentines.

A particularly advantageous embodiment of the PEM fuel cell stack according to the invention is obtained if the weave direction of the carbon fiber fabric from which the gas distribution layers are made is turned at an angle $\alpha$ of 20 to 70, preferably 30 to 60, and particularly of 45° to the flow channels on the bipolar plates, or if the carbon fiber fabric is woven in a structure such that at least 60% of the fibers exhibit an angle of at least 30° to the channel structure of the bipolar plates. In this case a further improvement of the transport properties and water content of the gas distribution layers is obtained, since penetration of the fabric into the gas distribution channels and hence obstruction of the gas flow in the channels is further reduced. The same positive effect is also obtained if the gas distribution channels are arranged in a suitable pattern on the bipolar plates.

The PEM fuel cell stacks according to the invention display good access by the reactive gases to the catalytically active centers of the membrane electrode assemblies, effective humidifying of the ionomer in the catalyst layers and the membrane and straightforward removal of the reaction product water from the cathode side of the membrane electrode assemblies.

Commercial coarse-pore carbon fiber fabrics with porosities of 50 to 95% can be used to produce the gas distribution layers according to the invention. Various base materials, which differ in structure, manufacturing process and properties, are available. Examples of such materials are AvCarb 1071 HCB from Textron Inc. or Panex 30 from Zoltek, Inc.

The commercial, coarse-pore carbon fiber fabrics can be impregnated with hydrophobic polymer before use. Suitable hydrophobic polymers are polyethylene, polypropylene, polytetrafluoroethylene or other organic or inorganic hydrophobic materials. Suspensions of polytetrafluoroethylene or polypropylene are preferably used for impregnation. Depending on the application, the carbon fiber substrates can be loaded with 3 to 30 wt. % of hydrophobic polymer. Loads of 4 to 20 wt. % have proven to be particularly effective. Different loads can be used for the gas distribution layers at the anode and cathode. The impregnated carbon fiber substrates are dried at temperatures of up to 250° C. under vigorous air exchange. Drying in a circulating air drying oven at 60 to 220, preferably 80 to 140° C., is particularly preferred. This is followed by sintering of the hydrophobic polymer. In the case of PTFE, for example, this takes place at a temperature of 330 to 400° C.

BRIEF DESCRIPTION OF DRAWINGS

The present invention will be further understood with reference to the accompanying drawings, wherein:

FIG. 6 is a graph of cell voltage as a function of current density during operation with reformate/air for the membrane electrode assembly in example 1 and 2.

DETAILED DESCRIPTION OF INVENTION

Figure 1:
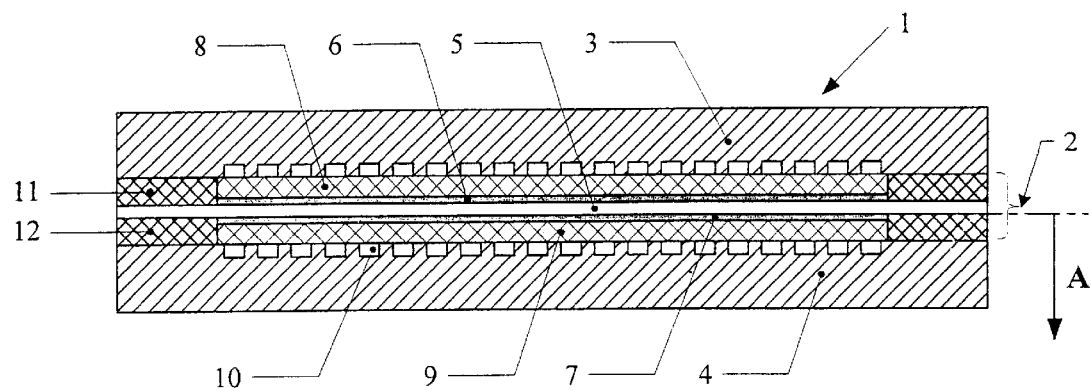
FIG. 1 is a cross-section view through a PEM fuel cell stack containing a membrane electrode assembly according to the invention.

FIG. 1 shows a cross-section through a PEM fuel cell stack (1) which for the sake of clarity consists of only one membrane electrode assembly (2). (5) indicates the polymer electrolyte membrane, both sides of which are in contact with the catalyst layers (6) and (7). The surface area of the catalyst layers is less than that of the membrane, such that the polymer electrolyte membrane extends beyond the catalyst layers on all sides, forming a margin that is free from coating. The gas distribution layers (8) and (9) are laid exactly on top of the catalyst layers. The bipolar plates (3,4) with the gas distribution channels (10) are placed on either side of the gas distribution layers. Two perforated seals (11 and 12), whose perforated surface is the same size as the catalyst layers, are provided to seal the membrane electrode assembly, comprising the polymer electrolyte membrane, catalyst layers and gas distribution layers.

Non-compressible polymer films or composite polymer films such as glass fiber-reinforced PTFE films, for example, are used as seals (11 and 12). During assembly of the fuel cell stack the entire stack is compressed in the direction perpendicular to the polymer electrolyte membrane by screwing it down. The thickness of the sealing films is therefore chosen such that after assembly the compressible gas distribution layers are compressed to the required extent.

Figure 2:
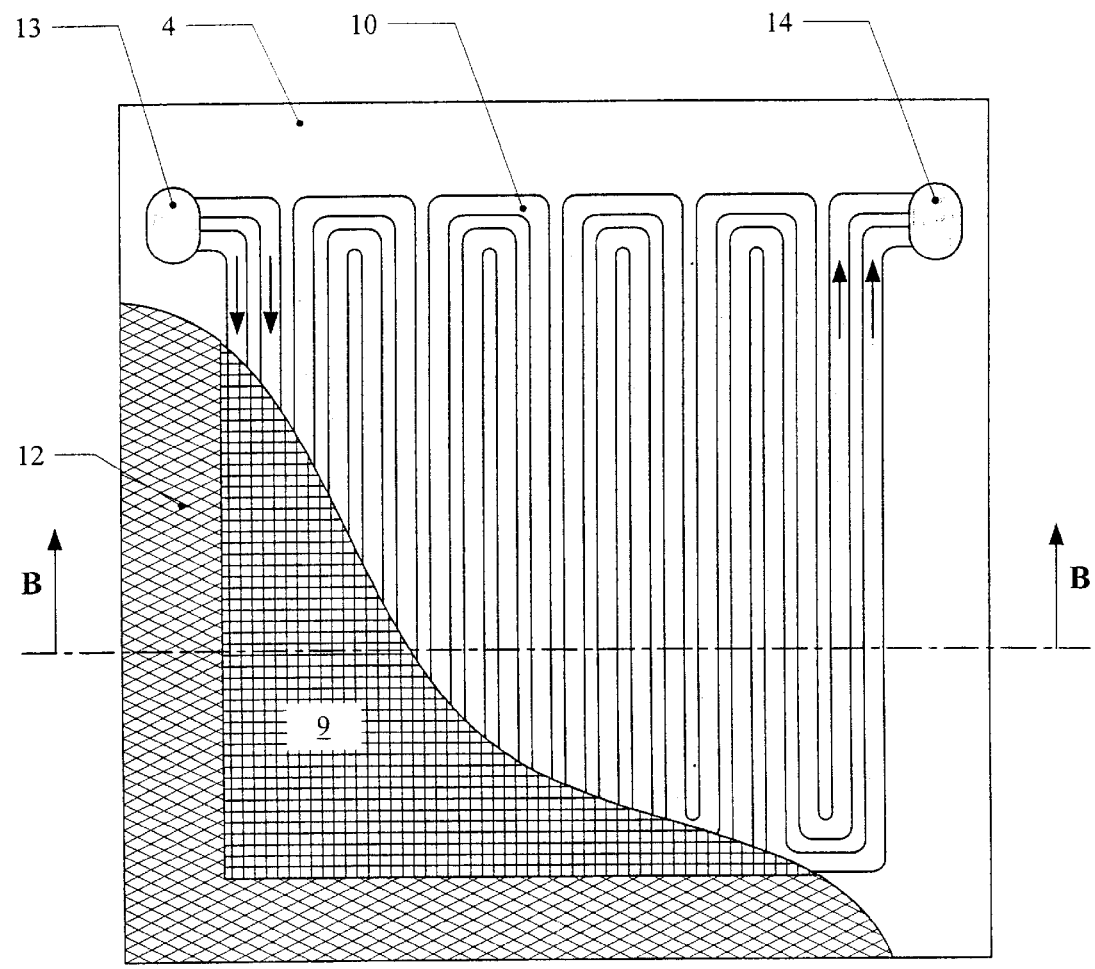
FIG. 2 is a top view of a bipolar plate with superposed gas distribution layer and seal.

FIG. 2 shows a top view of the bipolar plate (4) according to FIG. 1, view A, with superposed gas distribution layer (9) and seal (12). The gas distribution layer (9) and seal (12 are only partly shown, leaving a clear view of the channel structure of the bipolar plate. The gas distributor channels (10) are arranged in a double serpentine structure and connect the inlet channel (13) with the outlet channel (14), both of which pass vertically through the cell stack. In FIG. 2 the crosshatching on the gas distribution layer (9) indicates the conventional orientation of the fabric structure perpendicular and parallel to the main directions of extension of the gas distribution channels. The cross-section of the PEM fuel cell stack shown in FIG. 1 corresponds to the section B—B in FIG. 2.

Figure 3:
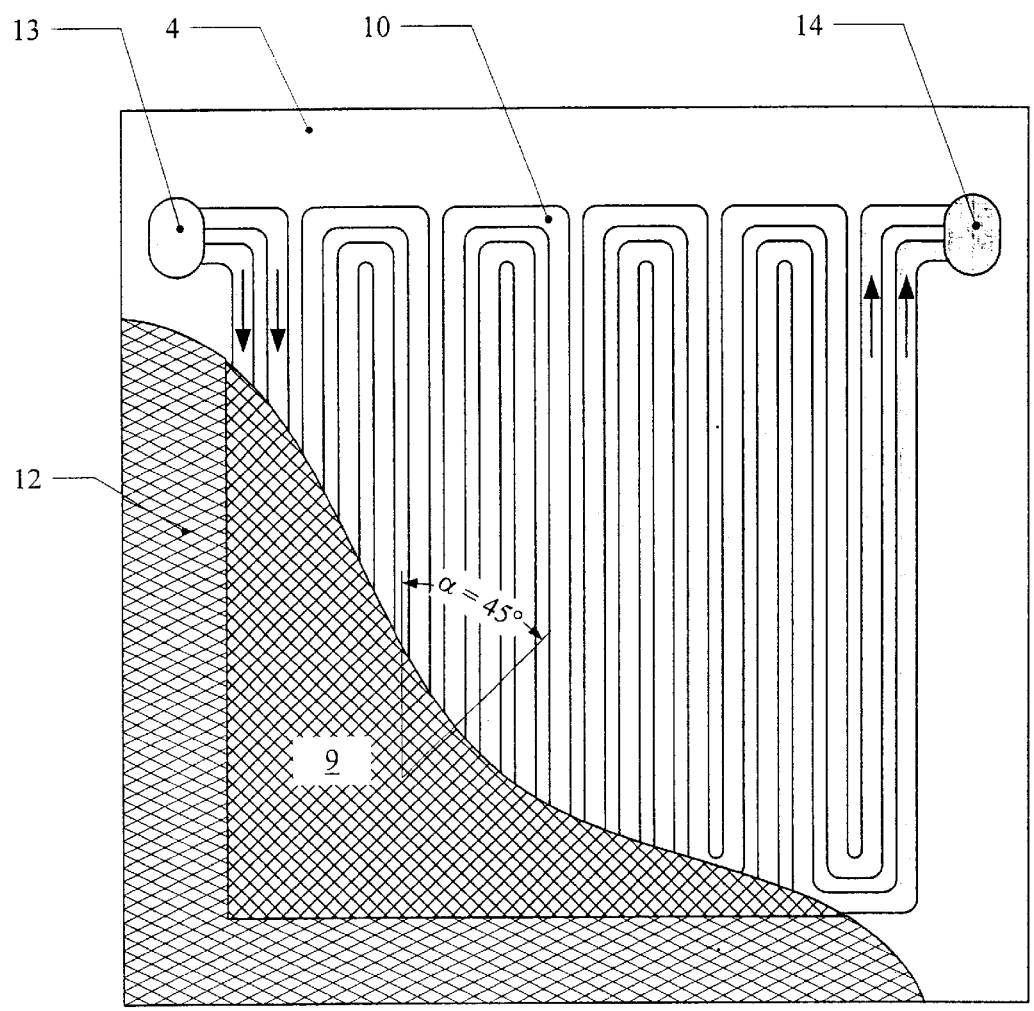
FIG. 3 is a top view of a bipolar plate with superposed gas distribution layer and seal.

FIG. 3 is identical to FIG. 2 apart from the orientation of the carbon fiber fabric from which the gas distribution layer (9) is made. In FIG. 3 the weave structure of the carbon fiber fabric is turned at an angle $\alpha=45°$ relative to the main directions of extension of the gas distribution channels, in accordance with the preferred embodiment of the invention.

The following examples and comparative examples are intended to provide further explanation of the invention for the person skilled in the art.

Comparative Example 1 (CE1)

Carbon fiber fabric type AvCarb 1071 HCB from Textron Inc. with a weight per unit area of 115 g/m² and a thickness of 380 µm was immersed in a suspension of PTFE in water (Hostaflon TF5235, Dyneon GmbH). The material was removed after a few seconds. After allowing the suspension adhering to the surface to drop off, the carbon fiber fabric was dried in a circulating air drying oven at 110° C. The impregnated carbon fiber fabric was sintered in a chamber furnace at 340 to 350° C. for approx. 15 minutes to melt the PTFE incorporated into the structure.

By adjusting the PTFE concentrations in the suspension, carbon fiber fabrics were produced with a PTFE content of 14.5±0.5 wt. % for the anode and 6.5±0.5 wt. % for the cathode of a fuel cell.

These carbon fiber fabrics were then coated with a paste consisting of Vulcan XC-72 carbon black and PTFE, dried and calcined again. The ratio of the percentages by weight of carbon black and PTFE was 7:3. The coating thickness of the dried and calcined paste was 4.1±0.2 mg/cm².

The average thickness of the finished carbon fiber fabric was 330 µm.

These anode and cathode gas distribution layers were incorporated along with a membrane electrode assembly into a fuel cell test cell with a double serpentine structure. The fabric was oriented such that the cross weave was positioned parallel ($\alpha=0°$) or at an angle $\alpha=90°$ (cross fibers) to the direction of the gas distribution channels. In assembling the test cell the bipolar plates were screwed together so tightly that the gas distribution layers including the catalyst layer were compressed to the thickness of the seals.

Two Chemglas seals (non-compressible, glass fiber-reinforced PTFE, 0.14 mm thick) with an overall thickness of 0.28 mm were used as seals (see FIG. 1). Together with a thickness for the catalyst layer of 20 µm, this results in a compression of the gas distribution layers to 36.4% of their original thickness.

The catalyst-coated membrane used in this example was prepared as follows:

The polymer electrolyte membrane and the ionomer for the reaction layers were both used in their non-acidic form and on completion of the manufacturing process were converted back to their acidic, proton-conducting modification using sulfuric acid.

The following inks or pastes were used to produce the reaction layers:

Ink A:

| | |
|---|---|
| Catalyst 5.53 g | 40% Pt on Vulcan ® XC-72 carbon black |
| Nafion solution 43.92 g | 4.2 wt. % in propylene glycol |
| Sodium hydroxide solution 0.59 g | 15 wt. % in water |

Ink B:

| | |
|---|---|
| Catalyst: 5.45 g | 40% PtRu (1:1) on Vulcan ® XC-72 carbon black |
| Nafion solution 43.13 g | 4.2 wt. % in propylene glycol |
| Sodium hydroxide solution 0.59 g | 15 wt. % in water |

The various components of the above formulations were mixed together and then carefully homogenized using a three-roll mill.

To form the cathode layer the ink A was printed onto a Nafion® 112 membrane (thickness 50 µm) in the Na⁺ form using the screen printing method and dried at 90° C. The back of the membrane was then coated in the same way with catalyst ink B to form the anode layer. Reprotonation was performed in 0.5 M sulfuric acid. The platinum load in the cathode layer was 0.4 mg Pt/cm², that of the anode layer 0.3 mg Pt/cm². This corresponded to a total platinum load in the coated membrane of 0.7 mg/cm². The coating thicknesses were in the range from 15 to 20 µm. The printed surface area in each case measured 50 cm².

EXAMPLE 1

Carbon fiber fabric type AvCArb 1071 HCB from Textron Inc. with a weight per unit area of 115 g/m² and a thickness of 380 μm was immersed in a suspension of PTFE in water (Hostaflon TF5235, Dyneon GmbH). The material was removed after a few seconds. After allowing the suspension adhering to the surface to drip off, the carbon fiber fabric was dried in a circulating air drying oven at 100° C. The impregnated carbon fiber fabric was sintered in a chamber furnace at 340 to 350° C. for approx. 15 minutes to melt the PTFE incorporated into the structure.

By adjusting the PTFE concentrations in the suspension, carbon fiber papers were produced with a PTFE content of 14.5±0.5 wt. % for the anode and 6.5±0.5 wt. % for the cathode of a fuel cell.

The average thickness of the finished carbon fiber fabric was 330 μm.

These anode and cathode gas distribution layers were incorporated along with a catalyst-coated membrane according to comparative example 1 into a fuel cell test cell with a double serpentine structure. The fabric was oriented such that the cross weave was positioned parallel ($\alpha=0°$) or at an angle $\alpha=90°$ (cross fibers) to the direction of the gas distribution channels. In assembling the test cell the bipolar plates were screwed together so tightly that the gas distribution layers including the catalyst layer were compressed to the thickness of the seals.

Two Chemglas seals (non-compressible, glass fiber-reinforced PTFE, 0.14 mm thick) with an overall thickness of 0.28 mm were used as seals (see FIG. 1). Together with a thickness for the catalyst layer of 20 μm, this results in a compression of the gas distribution layers to 36.4% of their original thickness.

Comparative Example 2

The carbon fiber fabrics were hydrophobed and sintered as in example 1. The PTFE content was 14.5±0.5 wt. % for the anode and 6.5±0.5 wt. % for the cathode.

These anode and cathode gas distribution layers were incorporated along with a catalyst-coated membrane according to comparative example 1 into a fuel cell test cell with a double serpentine structure. The fabric was oriented such that the cross weave was positioned parallel ($\alpha=0°$) or at an angle $\alpha=90°$ (cross fibers) to the direction of the gas distribution channels. In assembling the test cell the bipolar plates were screwed together so tightly that the gas distribution layers including the catalyst layer were compressed to the thickness of the seals.

Two Chemglas seals (non-compressible, glass fiber-reinforced PTFE, 0.08 mm thick) with an overall thickness of 0.16 mm were used as seals. Together with a thickness for the catalyst layer of 20 μm, this results in a compression of the gas distribution layers to 18.2% of their original thickness.

Comparative Example 3

The carbon fiber fabrics were hydrophobed and sintered as in example 1. The PTFE content was 14.5±0.5 wt. % for the anode and 6.5±0.5 wt. % for the cathode.

These anode and cathode gas distribution layers were incorporated along with a catalyst-coated membrane according to comparative example 1 into a fuel cell test cell with a double serpentine structure. The fabric was oriented such that the cross weave was positioned parallel ($\alpha=0°$) or at an angle $\alpha=90°$ (cross fibers) to the direction of the gas distribution channels. In assembling the test cell the bipolar plates were screwed together so tightly that the gas distribution layers including the catalyst layer were compressed to the thickness of the seals.

Two Chemglas seals (non-compressible, glass fiber-reinforced PTFE, 0.27 mm thick) with an overall thickness of 0.54 mm were used as seals. Together with a thickness for the catalyst layer of 20 μm, this results in a compression of the gas distribution layers to 75.8% of their original thickness.

EXAMPLE 2

The carbon fiber fabrics were hydrophobed and sintered as in example 1. The PTFE content was 14.5±0.5 wt. % for the anode and 6.5±0.5 wt. % for the cathode.

These anode and cathode gas distribution layers were incorporated together with a catalyst-coated membrane according to comparative example 1 into a fuel cell test cell with a double serpentine structure. The fabric was oriented such that the cross weave was positioned at an angle $\alpha$ of 45° to the direction of the gas distribution channels. In assembling the test cell the bipolar plates were screwed together so tightly that the gas distribution layers including the catalyst layer were compressed to the thickness of the seals.

Two Chemglas seals (non-compressible, glass fiber-reinforced PTFE, 0.14 mm thick) with an overall thickness of 0.28 mm were used as seals. Together with a thickness for the catalyst layer of 20 μm, this results in a compression of the gas distribution layers to 36.4% of their original thickness.

Electrochemical Tests

Figure 4:
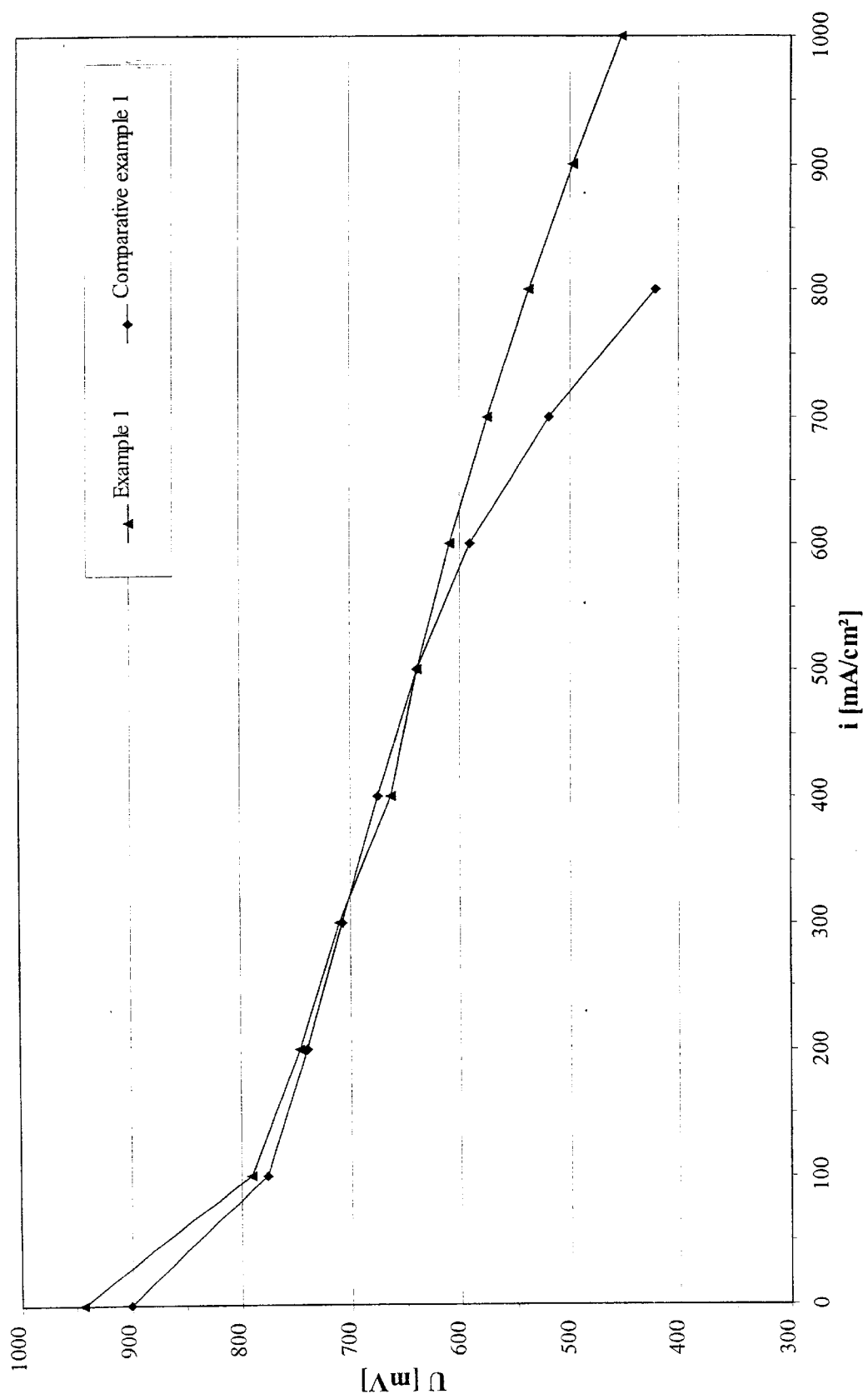
FIG. 4 is a graph of cell voltage as a function of current density during operation with reformate/air for the membrane electrode assembly in example 1 and comparative example 1.
Figure 5:
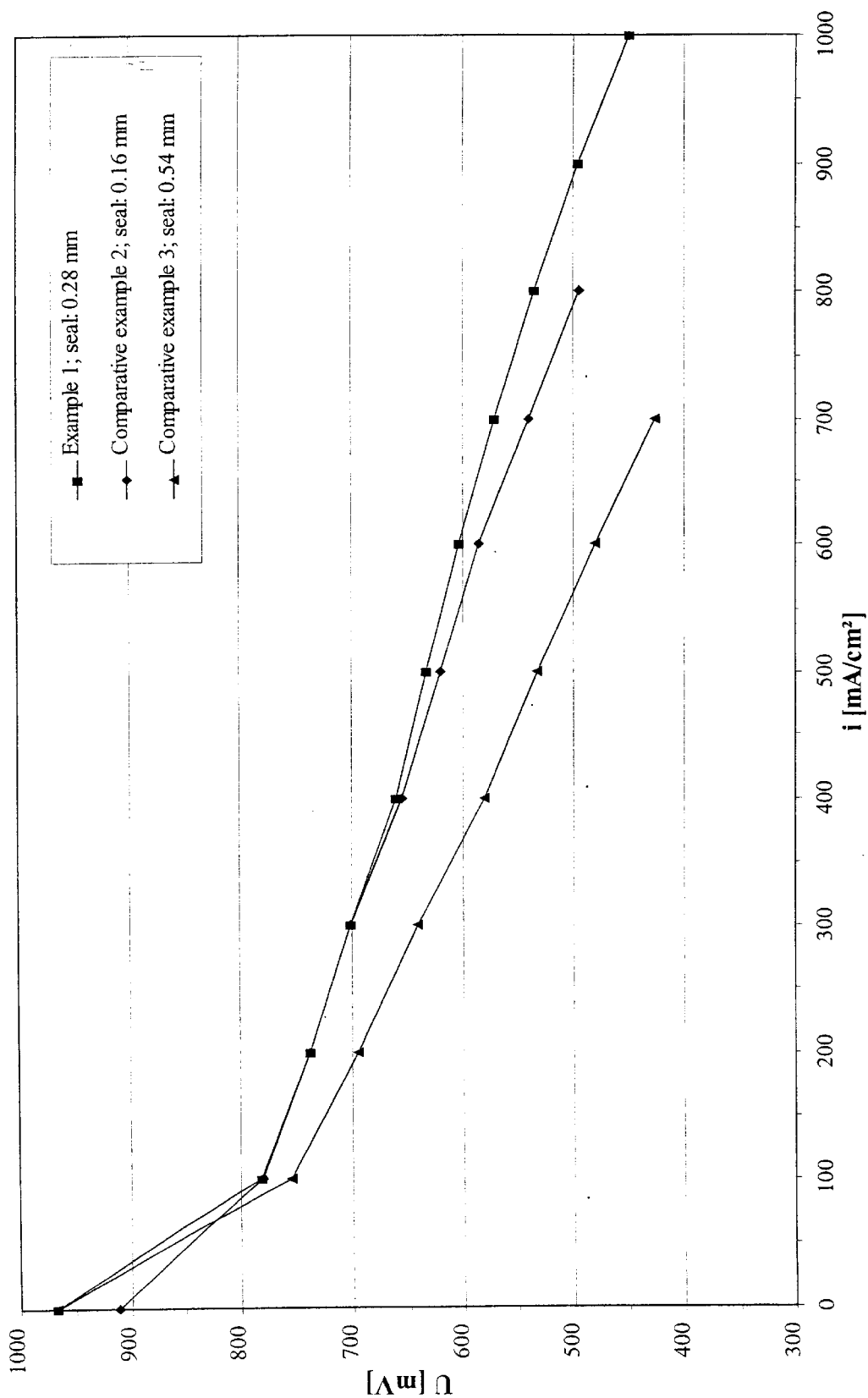
FIG. 5 is a graph of cell voltage as a function of current density during operation with reformate/air for the membrane electrode assembly in example 1, comparative example 2 and comparative example 3.

The measured voltages of the cells according to comparative examples 1, 2 and 3 and examples 1 and 2 in operation with reformate/air as a function of current density are shown by way of example in FIG. 4 for the cells in comparative example 1 and example 1 and in FIG. 5 for the cells in example 1, comparative example 2 and comparative example 3. FIG. 6 shows a comparison of the output data for the cells according to example 1 and 2. The cell temperature was 75° C. The operating pressure of the reactive gases was 1 bar. The hydrogen content of the reformate was 45 vol. %. The CO concentration was 50 ppm. To increase the fuel cell output 3 vol. % air (air-bleed) was added to the anode gas. It can be seen that the fuel cell stacks according to the invention with the gas distribution layers according to the invention deliver a clearly improved electrical output in comparison to the prior art (CE1).

Table 1 shows the cell voltages measured when the cells were loaded with a current density of 600 mA/cm².

Table 1: Cell voltages in operation with reformate/air at 600 mA/cm².

| Example | Cell voltage [mV] |
|---|---|
| Comparative example 1 | 599 |
| Example 1 | 609 |
| Comparative example 2 | 585 |
| Comparative example 3 | 480 |
| Example 2 | 612 |

Examples 1 and 2 show an improved output in comparison with comparative examples 2 and 3. There is even a slight output advantage at low and high current densities in comparison to the gas distribution layers coated with a carbon black/PTFE microporous layer as described in comparative example 1. The main advantage in this case, however, is that the complex production of the carbon black/PTFE microporous layer is avoided. Further variations and modifications of the foregoing will be apparent to those skilled in the art and are intended to be encompassed by the claims appended hereto. German priority application 100 42 744.8 of Aug. 31, 2000 is relied on and incorporated herein by reference.

We claim:

1. PEM fuel cell stack comprising a plurality of fuel cells arranged on top of one another, each of said fuel cells contains a membrane electrode assembly between the surfaces of two electrically conductive bipolar plates, said surfaces containing a plurality of flow channels open on one side for the supply of reactive gases, the membrane electrode assembly comprises a polymer electrolyte membrane each side of which is in contact with a reaction layer, each such reaction layer having a surface area smaller than that of the polymer electrolyte membrane, a compressible, coarse-pore gas distribution layer made from carbon fiber fabric being positioned between each reaction layer and the adjacent bipolar plates congruent to the reaction layers, there being seals in an area between said plates outside the surface covered by the gas distribution layers, whereby the gas distribution layers in the no-load condition display a thickness $D_1$ and the seals a thickness $D_2$, said gas distribution layers in the PEM fuel cell stack being compressed to 25 to 60% of their original thickness.

2. PEM fuel cell stack according to claim 1, wherein the seals consist of non-compressible material and the compression of the fuel cell stack is obtained by the ratio $D_2/D_1$.

3. PEM fuel cell stack according to claim 2, wherein the weave direction of the carbon fiber fabric is oriented at an angle of 20 to 70° to the flow channels on the bipolar plates.

4. PEM fuel cell stack according to claim 2, wherein the weave direction of the carbon fiber fabric is oriented at an angle of 30 to 60° to the flow channels on the bipolar plates.

5. PEM fuel cell stack according to claim 2, wherein the carbon fiber fabric is woven in a structure such that at least 60% of the fibers display an angle of at least 30° to the channel structure of the bipolar plates.

6. PEM fuel cell stack according to claim 1, wherein the porosity of the gas distribution layers used is reduced by compression to 20 to 70% and their electrical resistance to below 6 mΩ cm.

7. PEM fuel cell stack according to claim 6, wherein the weave direction of the carbon fiber fabric is oriented at an angle of 20 to 70° to the flow channels on the bipolar plates.

8. PEM fuel cell stack according to claim 6, wherein the weave direction of the carbon fiber fabric is oriented at an angle of 30 to 60° to the flow channels on the bipolar plates.

9. PEM fuel cell stack according to claim 6, wherein the carbon fiber fabric is woven in a structure such that at least 60% of the fibers display an angle of at least 30° to the channel structure of the bipolar plates.

10. PEM fuel cell stack according to claim 1, wherein the weave direction of the carbon fiber fabric is oriented at an angle of 20 to 70° to the flow channels on the bipolar plates.

11. PEM fuel cell stack according to claim 1, wherein the weave direction of the carbon fiber fabric is oriented at an angle of 30 to 60° to the flow channels on the bipolar plates.

12. PEM fuel cell stack according to claim 1, wherein the carbon fiber fabric is woven in a structure such that at least 60% of the fibers display an angle of at least 30° to the channel structure of the bipolar plates.

13. Electric car containing a PEM fuel cell stack for electrical energy supply, which includes a PEM fuel stack according to claim 1.

14. A PEM fuel cell comprising a membrane electrode assembly between the surfaces of two electrically conductive bipolar plates, said surfaces containing a plurality of flow channels open on one side for the supply of reactive gases, the membrane electrode assembly comprises a polymer electrolyte membrane, each side of which is in contact with a reaction layer, each such reaction layer having a surface area smaller than that of the polymer electrolyte membrane, a compressible, coarse-pore gas distribution layer made from carbon fiber fabric being positioned between each reaction layer and the adjacent bipolar plates congruent to the reaction layers, there being seals in an area between said plates outside the surface covered by the gas distribution layers, whereby the gas distribution layers in the no-load condition display a thickness $D_1$ and the seals a thickness $D_2$, said gas distribution layers in the PEM fuel cell stack being compressed to 25 to 60% of their original thickness.

15. The PEM fuel cell according to claim 14, wherein the seals consist of non-compressible material and the compression of the fuel cell stack is obtained by the ratio $D_2.D_1$.

16. The PEM fuel cell according to claim 14, wherein the porosity of the gas distribution layers used is reduced by compression to 20 to 70% and their electrical resistance to below 6 mΩ cm.

17. The PEM fuel cell according to claim 14, wherein the weave direction of the carbon fiber fabric is oriented at an angel of 20 to 70° to the flow channels on the bipolar plates.

18. The PEM fuel cell according to claim 17, wherein the weave direction of the carbon fiber fabric is oriented at an angle of 30 to 60° to the flow channels on the bipolar plates.

19. A method of assembly a PEM fuel cell stack formed of a plurality of fuel cells arranged on tope of one another, each of which contains a membrane electrode assembly between two electrically conductive bipolar plates, the surfaces of which are equipped with flow channels open on one side for the supply of reactive gases, whereby the membrane electrode assemblies each comprise a polymer electrolyte membrane, both sides of which are in contact with a reaction layer, whereby the surface area of the reaction layers is smaller than that of the polymer electrolyte membrane and a compressible, coarse-pore gas distribution layer made from carbon fiber fabric is inserted between each reaction layer and the adjacent bipolar plates congruent to the reaction layers along with seals in the area outside the surface covered by the gas distribution layers, whereby the gas distribution layers in the no-load condition display a thickness $D_1$ and the seals a thickness $D_2$, comprising stacking at least two of said fuel cells together and compressing a stack of said fuel cells in a direction perpendicular to the polymer electrolyte membrane such that the gas distribution layers in the PEM fuel cell stack are compressed to 25 to 60% of their original thickness.

* * * * *